Sept. 16, 1969      H. G. STENGER      3,466,702
APPARATUS FOR MAKING HOLLOW PLASTIC OBJECTS
Filed Aug. 25, 1966      3 Sheets-Sheet 1
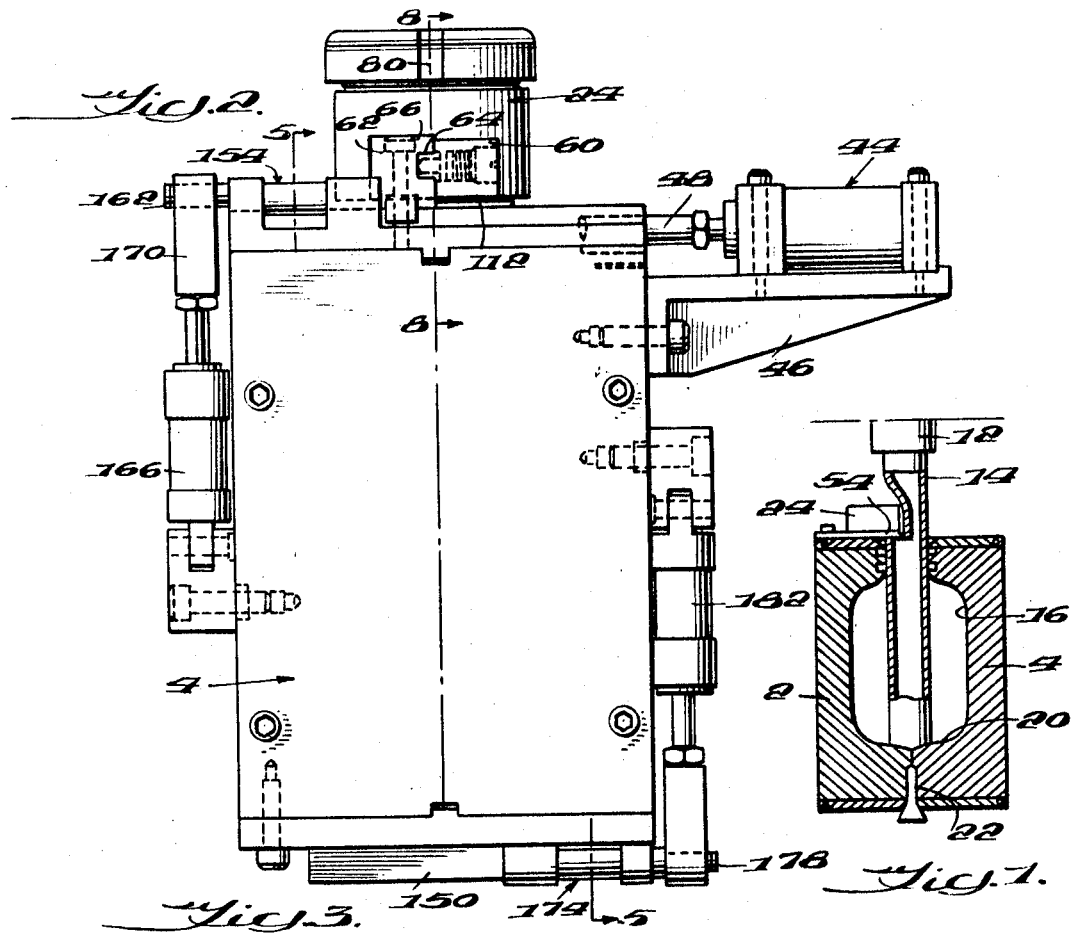
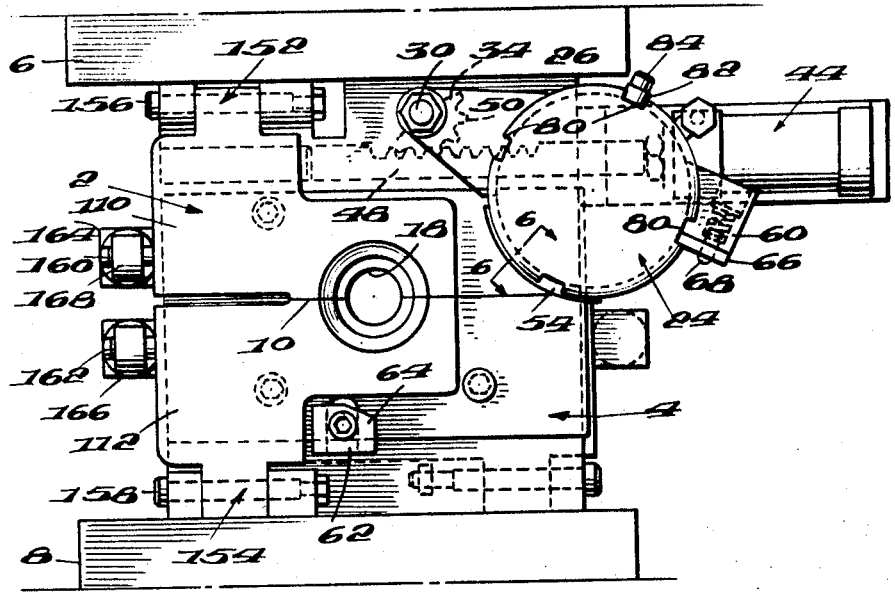

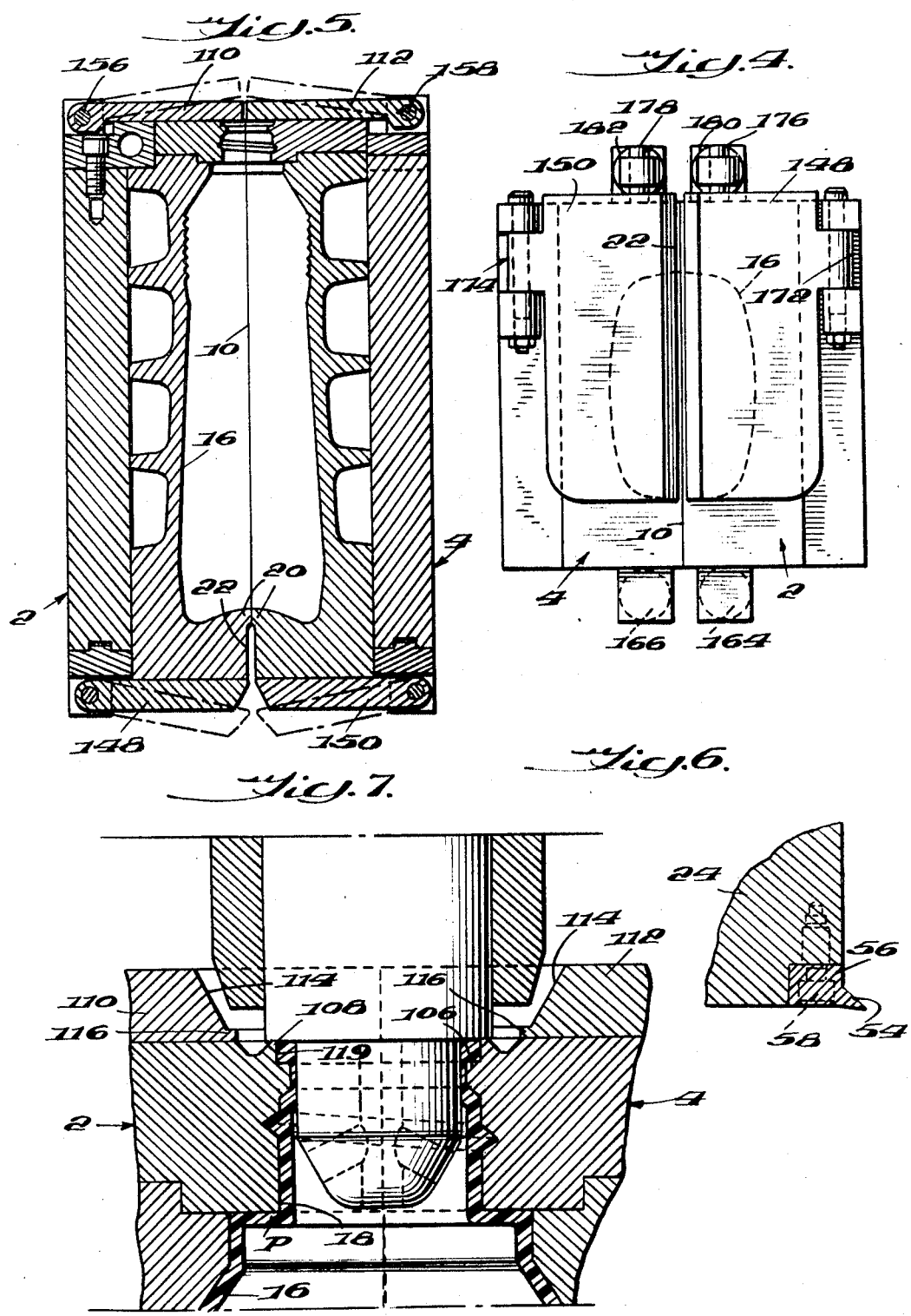

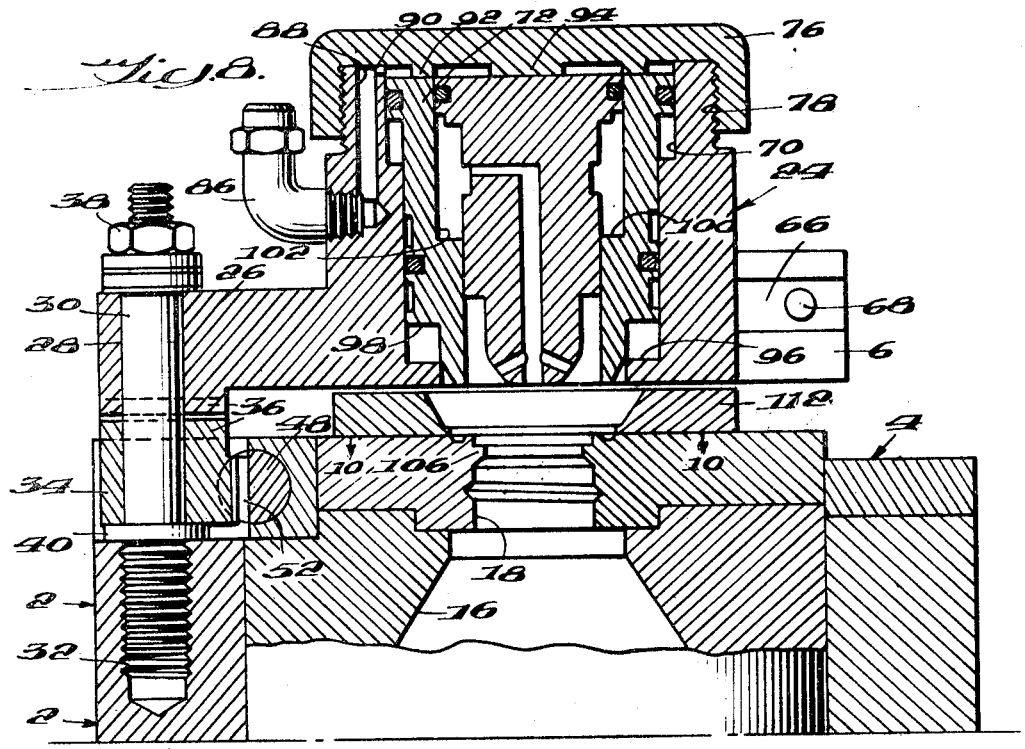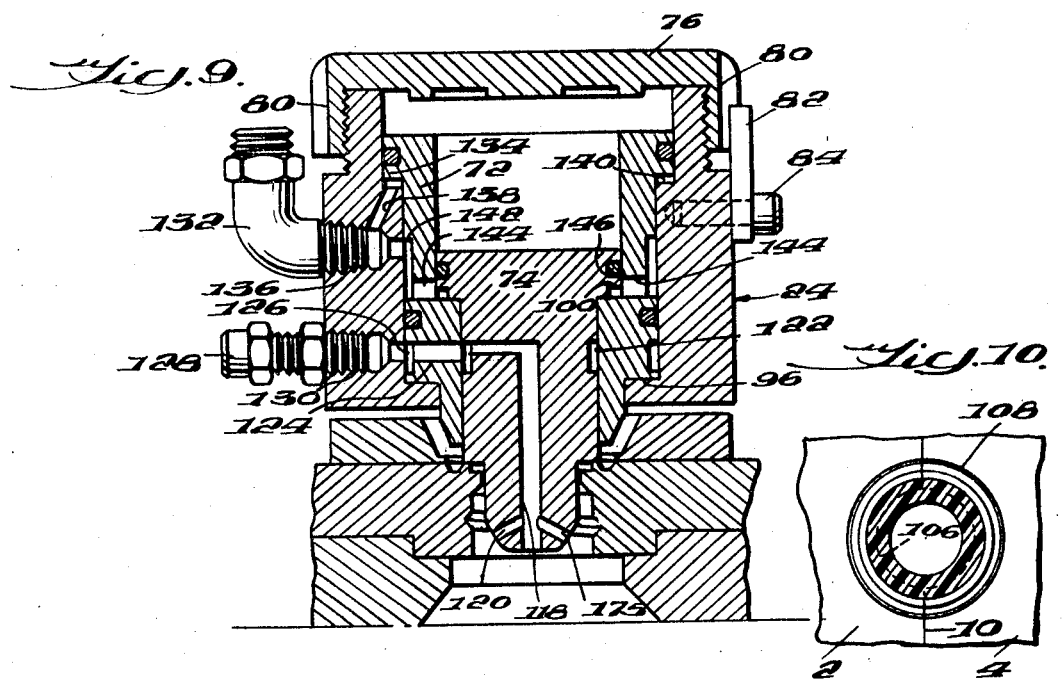

United States Patent Office 3,466,702
Patented Sept. 16, 1969

3,466,702
APPARATUS FOR MAKING HOLLOW PLASTIC OBJECTS
Hans G. Stenger, Plainfield, N.J., assignor, by mesne assignments, to American Can Company, New York, N.Y., a corporation of New Jersey
Filed Aug. 25, 1966, Ser. No. 575,112
Int. Cl. B29c 3/02, 17/07
U.S. Cl. 18—5                      9 Claims

ABSTRACT OF THE DISCLOSURE

In blow molding plastic bottles, a turret is pivotal to a position overlying an opening at the top of a mold cavity formed by two mold sections. The turret carries a mandrel which is displaced into the mold opening, and gas under pressure is introduced through said mandrel, whereby a parison clamped between the mold sections is blown to fill the mold cavity. Displacement of the mandrel compresses the parison into the mold opening to form a neck on the bottle.

---

This invention relates to hollow plastic articles, and more particularly, to methods and apparatus for forming and trimming blow molded bottles.

In accordance with conventional practice, hollow plastic bottles are formed from thermoplastic materials by first extruding a tubular parison, and then pinching together one end of the parison in a mold. The mold cavity surrounding the parison is in the shape of the bottle and the mold cavity portion forming the neck of the bottle is at the open end of the parison. Air is injected into the interior of the parison to cause it to be inflated and to fill the internal cavity in the mold. Usually, the air is injected into the parison through a mandrel which is inserted in the open end of the parison.

In order to permit the mandrel to be inserted in the end of the tubular parison, a typical mandrel is slightly smaller in external diameter than the internal diameter of the parison. When the mold closes around the parison and the mandrel, there is a tendency for seams or folds to form in the parison at the neck portion. If a larger diameter mandrel were used, it could not be readily inserted in the parison by conventional practice. The unsupported parison would be pushed into the mold cavity by the end of the mandrel.

Usually, the entire bottle, including the neck portion, is formed by expanding the parison outwardly against the mold cavity wall. Certain types of bottles, however, require caps which fit inside the neck, and therefore, the shape of the inside of the bottle neck must be made to conform to the shape and size of the cap. Since the inside dimensions of blow molded bottle necks cannot be accurately controlled, it is necessary to ream out the bottle necks to receive those recessed caps. This requires a separate operation and therefore increases the cost of the bottles.

Accordingly, it is an object of this invention to provide an improved apparatus for forming and trimming bottles.

It is another object of this invention to provide an apparatus for forming neck portions of blow molded bottles which do not have seams or folds therein.

It is a further object of this invention to provide an apparatus for forming blow molded bottles in which the wall thickness of the neck portion is substantially greater than that of the walls of the bottle.

These objects are accomplished in accordance with a preferred embodiment of the invention by extruding a tubular parison between a pair of mold sections and closing the mold about the parison, thereby pinching together one end of the parison. The opposite end of the parison is severed from the extruded tube by a turret which swings across the side of the mold. The severed end of the parison remains open in the neck portion of the mold cavity. A mandrel in the form of a piston in the turret is aligned with the open end of the parison. The piston has a beveled face to displace the parison wall radially outward as the piston enters the open end of the parison. The parison forms a seal between the neck portion of the mold cavity and the piston to prevent leakage of gas from the interior of the parison. Air is then injected through the piston into the interior of the parison to cause it to be inflated outwardly against the interior surface of the mold cavity.

The mold apparatus includes a turret at the top of the mold assembly which severs the extruded tube to form a parison. The turret moves into alignment with the upper end of the parison and the piston in the turret is projected into the end of the parison. A sleeve surrounds the piston in the turret and is projected into the mold after the piston to displace the flash outwardly from the neck. The flash then may be easily removed. Air is then blown through a nozzle in the piston into the interior of the parison for blowing the parison into the mold cavity. The piston and the sleeve are then retracted back into the turret and the turret rotates to its initial position. The flash is then stripped from the mold and the mold is opened to release the completed bottle.

This preferred embodiment is illustrated in the accompanying drawings in which:

FIG. 1 is a schematic cross sectional view of the blow molding apparatus of this invention;

FIG. 2 is a side elevational view of the apparatus showing the turret in alignment with the opening in the mold;

FIG. 3 is a top plan view of the apparatus showing the turret in retracted position;

FIG. 4 is a bottom plan view of the apparatus;

FIG. 5 is a cross sectional view of the apparatus along the line 5—5 in FIG. 2;

FIG. 6 is a cross sectional view of the turret along the line 6—6 in FIG. 3;

FIG. 7 is an enlarged detailed view of the piston inserted in the mold;

FIG. 8 is an enlarged cross sectional view of the turret and mold along the line 8—8 in FIG. 2;

FIG. 9 is an enlarged detail cross sectional view of the turret and mold showing the position of the piston and sleeve in their extended positions; and FIG. 10 is a cross sectional view of the mold along the line 10—10 in FIG. 8 showing the parison clamped in the opening at the top of the mold.

Referring to FIGS. 1, 2 and 3, the apparatus of this invention includes a pair of separable mold sections 2 and 4 which are mounted on reciprocating press platens 6 and 8, respectively. The mold sections 2 and 4 have opposed faces which form a parting line 10 when the mold is closed.

As shown in FIG. 1, mold sections 2 and 4 are positioned under an extrusion die 12 with the parting line 10 aligned with the central axis of the extruded tube 14 of thermoplastic material. A mold cavity 16, shown in FIGS. 1 and 5, is formed in the mold sections 2 and 4. When the mold is closed, the cavity 16 is in the shape of the bottle that is to be molded. The mold sections 2 and 4 define a circular opening 18 at the top of the mold. At the bottom of the mold, the opposed faces of the sections 2 and 4 project into abutting relation to form edges 20 to pinch off and close the lower end of the extruded tube 14, when the mold is closed around the tube. The lower portion of the tube 14 is clamped in a transverse groove 22 formed between the mold sections 2 and 4. At the top of the mold, the circular opening 18 allows the tube 14 to remain open.

A turret 24 is mounted for swinging movement on the top of the mold adjacent the opening 18. The turret includes an arm 26. The arm has a bore 28 (FIG. 8) for mounting the arm on an upright post 30. The post 30 is rigidly secured in the mold section 2 by being threaded into a socket 32. A sector gear 34 is also mounted on the post 30. The gear 34 and the arm 26 are rigidly connected together for turning movement relative to the post 30 by a plurality of radial, cooperating splines 36 on the respective elements. The arm 26 and gear 34 are secured together on the post 30 by a nut 38 that is threaded on the end of the post. A washer 40 is also mounted on the post 30 under the sector gear 34 and acts as a bearing for the gear 34. Washers 42 are also provided between the arm 26 and the nut 38.

Swinging movement of the turret 24 is accomplished by a fluid actuator 44, as shown in FIGS. 2 and 3, which is mounted on a bracket 46 extending outwardly from the mold section 2. The piston of the actuator 44 is connected to a rack 48 which is mounted for reciprocating movement in the mold section 2. The teeth 50 on the sector gear mesh with the teeth 52 of the rack, so that longitudinal movement of the rack 48 causes the arm 26 to swing about the post 30. When the rack is in its retracted position, as shown in FIG. 3, the turret 24 is displaced from the opening 18 to permit the mold to be closed around the tube 14. When the actuator 44 displaces the rack 48 to the position shown in FIGS. 2 and 8, the central axis of the turret 24 is aligned with the center of the opening 18.

The turret 24 has a knife blade 54 which extends outwardly from the lower edge of the turret, as shown in FIGS. 1 and 6. The knife blade 54 projects outwardly from a curved bar 56 which is secured along the lower edge of the turret 24 by a plurality of screws 58. As shown schematically in FIG. 1, the knife blade 54 severs the tube 14 at approximately the top edge of the mold. The curved knife blade 54 slices the tube with an arcuate motion as the turret swings toward the position shown in FIG. 2.

The turret 24 then continues its swinging movement until a stop bracket 60 on the turret engages a locating block 62 which is rigidly secured to the mold section 4. The block 62 has a transverse groove 64 for receiving a lateral rib 66 on the bracket 60. When the turret 24 is positioned over the opening 18, as shown in FIG. 2, the rib 66 cooperates with the groove 64 to resist upward displacement of the turret 24 during the blowing operation. The bracket 60 also includes a spring loaded plunger 68 which is depressed when the rib 66 enters the groove 64. The plunger imparts an initial displacement to the turret 24 during the return stroke of the rack 48, and thereby facilitates displacement of the turret to the position shown in FIG. 3. The plunger 68 also acts as a cushion for the turret as the rib 66 moves into the groove 64.

The turret 24 houses the piston assembly which forms the neck portion of the bottles in the mold and injects air into the interior of the clamped parison for inflating it outwardly into the mold cavity. When the turret is displaced to the position shown in FIG. 2, the central axis of the turret is aligned with the opening 18. As shown in FIG. 8, the turret 24 includes a cylinder 70 in which is mounted a sleeve 72. A piston 74 is mounted in the interior of the sleeve 72. The upper end of the cylinder 70 is closed by a cover 76. Internal threads on the cover 76 cooperate with screw threads 78 on the upper end of the turret 24. The cover 76 has a plurality of slots 80, shown in FIGS. 2, 3, and 9. A locking tab 82 is secured to the side of the turret 24 by a screw 84, shown in FIGS. 3 and 9, and extends into one of the slots 80 for preventing unscrewing of the cover.

The sleeve 72 and the piston 74 are displaced downwardly by fluid which flows into the turret 24 through a fitting 86. A passage 88 extends upwardly through the turret 24 to the cover 76 and a port 90 connects the passage 88 with the cylinder 70. The interior of the cover 76 has a stop ring 92 projecting downwardly therefrom in position for engaging the upper end of the sleeve 72. The extent of downward movement of the sleeve 72 is restricted by an internal shoulder 96 at the lower end of the cylinder 70. A corresponding shoulder 98 on the sleeve 72 engages the shoulder 96 when the sleeve 72 has been displaced downwardly in the cylinder 70.

Fluid also flows from the port 90 into the space between the piston 74 and the cover 76 for displacing the piston downwardly. Downward movement of the piston 74 relative to the sleeve 72 is limited by a shoulder 100 on the piston which engages a corresponding shoulder 102 in the sleeve 72. The sleeve 72 and the piston 74 are shown in the retracted position in FIG. 8. While in this position, there is sufficient clearance between the turret assembly and the mold sections to permit the turret to swing freely toward and away from the opening 18.

The mold sections 2 and 4 form the mold cavity 16 when they are positioned in abutting relation, as shown in FIG. 8. The neck portion of the cavity, which generally includes the opening 18, has a spiral groove 104 which forms a screw thread in the finished bottle. There is also a circumferential rib 106 at the top of the mold sections 2 and 4 and a circular ridge 108 surrounds the opening 18 (FIG. 7). A pair of stripper plates 110 and 112 are positioned on top of the mold sections 2 and 4, respectively, and the stripper plates 110 and 112 do not cover the opening 18, but have groove portions 114 which are concentric with the opening 18. The groove portions 114 have sloping side walls and the edges 116 of the plates 110 and 112 are spaced radially outward from the circular ridge 108.

When the mold sections close around the parison, the rib 106 pinches the parison at the parting line 10, since the rib 106 has a smaller diameter than the external diameter of the parison P, as shown in FIG. 10. The rib 106 thus supports the upper end of the parison in the opening 18 and prevents the open end of the parison from being pushed into the mold cavity by the end of the piston 74.

When fluid is introduced to the interior of the cylinder 70 through the fitting 86, the sleeve 72 moves downward and surrounds the exterior of the parison previously severed by the turret knife 54. The parison has an internal diameter that is slightly smaller than the internal diameter of the rib 106. The movement of the piston 74 lags behind that of the sleeve 72 and thus enters the open end of the parison after the sleeve 72 has surrounded the end of the parison. Downward movement of the sleeve 72 and the piston 74 continues until they reach the positions shown in FIGS. 7 and 9. The lower end of the piston 74 has a beveled peripheral edge 117 which displaces the soft plastic of the parison outwardly into the groove 104 and into adjacent portions of the opening 18. The piston 72 also has a shoulder 119 for compressing the plastic downwardly into the opening 18. The rib 106 cooperates with the shank portion of the piston 74 to restrict the flow of plastic between the piston and the rib 106. Therefore, the downward movement of the shoulder 119 causes the plastic between the rib 106 and the shoulder 119 to be compressed and a strong seat of plastic is formed by the shoulder 119 against which a screw cap may be sealed. Excess plastic flows outwardly over the ridge 108 where it is collected in the groove portions 114. When the piston is fully extended, the shoulder 119 engages the ridge 108, as shown in FIG. 7.

Air for blowing the parison outwardly against the wall of the cavity is conducted through a longitudinal passage 118 in the piston 74. The passage 118 has several branches 120 for directing the air outwardly against the interior surface of the parison. The piston 74 has a circumferential groove 122, and the passage 118 extends outwardly through the side of the piston 74 and communicates with the groove 122. The sleeve 72 has a radial passage 124 which communicates with the groove 122 in the piston and a similar circumferential groove 126 in the sleeve 72. A hose coupling 128 is the threaded into a bore 130 which communicates with the groove 126. Thus, air is supplied through the fitting 128 and through the sleeve 72 into the passage 118 in the piston 74. The grooves 122 and 126 allow air to flow from the bore 130 to the passage 118, although the passages 118 and 124 may not be aligned.

After the blowing operation has been completed, the piston and sleeve are retracted upwardly into turret 24 by fluid which is supplied under pressure through a fitting 132. The sleeve 72 has an outwardly projecting flange portion 134 (FIG. 9) and fluid is conducted from a bore 136 in which the fitting is secured, through a passage 138, and to the space between the shoulder 140 and the flange 134 to exert an upward force on the sleeve 72. The sleeve 72 also has a radial face 142 which extends around the outside of the sleeve and the bore 136 extends through the turret into the cylinder 70 below the face 142, so that the fluid pressure exerts an upward force on the sleeve 72. The sleeve 72 also has a plurality of radial ports 144 which establish communication between the bore 136 and a chamber adjacent the piston 74 formed by a radial face 146 in the piston.

Fluid under pressure is admitted through the coupling 132 and flows into the space opposite the radial faces 142 and 146 on the sleeve and piston, respectively. At the same time, the space above the piston and the sleeve is vented to the atmosphere through the coupling 86 (FIG. 8). The fluid pressure differential acting on the sleeve and piston causes these elements to move upwardly until the sleeve engages the ring 92 in the cover and the piston engages the projection 94 at the center of the cover. Thus, the piston and sleeve are retracted into the turret 24 and with the lower end of the piston clear of the stripper plates 110 and 112, the turret is free to swing to the position shown in FIG. 3.

After the turret has returned to the position shown in FIG. 3, the flash around the mouth of the bottle and the flash at the bottom of the bottle are removed prior to opening the mold. This is accomplished by the stripper plates 110 and 112 at the top of the mold, and another pair of stripper plates 148 and 150 at the bottom of the mold. The upper plates 110 and 112 are mounted for vertical swinging movement relative to their respective mold sections 2 and 4 by hinges 152 and 154, respectively. The stripper plate 110 swings vertically relative to the mold section 2 about a hinge pin 156 and the other stripper plate 112 swings vertically about a hinge pin 158.

Each of the stripper plates 110 and 112 has a peg 160 and 162 projecting outwardly, as shown in FIGS. 2 and 3. Fluid actuators 164 and 166 are mounted on the side of the respective mold sections 2 and 4, and the piston rod of the actuator is connected to the respective pegs 160 and 162 by a bearing 168 and 170. The pegs 160 and 162 are spaced outwardly from the respective hinges 152 and 154 so that when the actuators 164 and 166 are operated, the stripper plates 110 and 112 swing upwardly to the position shown in dotted lines in FIG. 5. At the lower end of the mold sections, the stripper plates 148 and 150 are mounted on hinges 172 and 174, respectively. The plates 148 and 150 each have outwardly projecting pegs 176 and 178, respectively, and a pair of fluid actuators 180 and 182 are mounted on the side of the mold sections for swinging the stripper plates 148 and 150 downwardly to the positions shown in dotted lines, as shown in FIG. 5. The actuators 180 and 182 are preferably double acting so that the position of the stripper plates is positively controlled at all times.

The purpose of the stripper plates is to remove the flash at the top and the bottom of the mold cavity. As shown in FIG. 7, flash is accumulated in the conical groove 114 of the respective stripper plates 110 and 112. Flash is also confined in the slot 22 at the bottom of the mold sections 2 and 4. After the turret 24 has returned to the position shown in FIG. 3, the fluid actuators swing the respective upper and lower stripper plates upwardly to the dotted line positions shown in FIG. 5. The vertical swinging of the stripper plates separates the flash from the molded bottle and the mold may then be opened to release the completed bottle.

In operation, a soft plastic is extruded downwardly from the die 12, as shown in FIG. 1, and the mold sections 2 and 4 close around the tube 14 and pinch the lower end in the groove 22. The upper end of the tube is supported by the opening 18 at the top of the mold sections. The actuator 44 then swings the turret 24 to the position shown in FIG. 2. The knife edge 54 on the turret severs the tube 14 at the top surface of the stripper plates 110 and 112 and the turret stops its movement when the bar 60 engages the stop 62. The turret is locked in position by the actuator 44. Fluid is then injected into the interior of the turret through the coupling 86 to displace the sleeve 72 downwardly into the groove 114 around the top of the parison. The piston 74 is also displaced downwardly, but due to the difference in surface area between the head ends of the piston and the sleeve, the piston 74 engages the shoulder 100 on the sleeve before the sleeve 72 has reached its outer limit of travel. When the sleeve face 98 engages the shoulder 96 on the turret, the passage 118 in the piston 74 is aligned with the passage 124 in the sleeve and air under pressure is injected into the interior of the mold cavity through the coupling 128. When this occurs, the parison expands to fill the mold cavity.

The sleeve and piston are retracted by directing fluid through the coupling 132 into the interior of the turret on the underside of the radial flange 134 on the sleeve and against the radial face 146 of the piston 74. When the sleeve and piston are fully retracted in the turret, the actuator 44 swings the turret 24 to the position shown in FIG. 3.

Prior to opening the mold, the actuators swing the stripper plates 110, 112 and 148 outwardly from the mold sections to separate the flash from the molded bottle. The mold sections are then separated to release the molded bottle.

Although actuators 44, 164, 166, 180 and 182 are used in the embodiment of the invention described herein, the turret and stripper plates may be operated by cams, or other suitable means.

The apparatus of this invention molds hollow articles in a continuous operation in which the parison is severed from an extruded tube. The neck portion of the article is formed by compression molding of the parison in the die and therefore has the required strength. The body of the bottle is blow molded to form an article with a relatively thin wall. The resulting article is not only of superior physical characteristics, but is produced economically.

This invention has been illustrated and described in an embodiment in which a single container is blown in the mold. It is possible to adapt this invention to tandem blow molding by mounting a turret at the top and bottom of the mold sections. Midway of the length of the mold between the turrets, projecting edges similar to the edges 20 pinch off the parison. Thus, two bottles are molded bottom to bottom from a single parison.

What is claimed is:

1. Apparatus for forming hollow plastic bottles from a tubular parison comprising:
  a pair of mold sections having opposed faces defining a mold cavity when said mold sections are in face to face abutting relation, said cavity including an opening at the top of said mold sections,
  a turret at the top of said mold sections, means for moving said turret into alignment with said opening and out of alignment wtih said opening,
  said turret including a piston reciprocally mounted within a sleeve,
  means for displacing said sleeve longitudinally towards said opening relative to said turret and said piston,
  means for displacing said piston into said opening, a pair of stripper plates adjacent said opening, said stripper plates having end portions cooperating with said sleeve to define a groove, said sleeve diverting flash outwardly into said groove while the piston is being inserted in the parison, means for displacing said stripper plates away from said opening whereby flash in said groove is separated from the molded article, and means for introducing gas under pressure through said piston while in said opening, whereby a parison clamped between said mold sections is blown to fill said mold cavity and displacement of said piston compresses said parison into said opening to form a bottle neck.

2. The apparatus according to claim 1 wherein said turret moving means includes means mounting said turret for swinging movement relative to one of said mold sections.

3. The apparatus according to claim 2 wherein said turret has a knife blade thereon, said blade being in position for severing an extruded plastic tube that projects above said opening upon swinging movement of said turret toward said opening.

4. The apparatus according to claim 3 wherein said blade is curved.

5. The apparatus according to claim 2 wherein said turret moving means includes an upright post on one of said mold sections, said post being spaced from said opening, means for mounting said turret for swinging movement on said post, and means for selectively swinging said turret relative to said post.

6. The apparatus according to claim 5 including a block on the other of said mold sections, a stop on said block, said stop and said block cooperating to secure said turret over said opening while the piston is being inserted into the parison.

7. The apparatus according to claim 1 wherein said cavity top opening is substantially cylindrical and includes a circumferential rib projecting into said opening, whereby a parison having a diameter larger than said rib is supported in said opening.

8. The apparatus according to claim 7 wherein said piston and said rib cooperate to restrict flow of plastic therebetween, said piston having a shoulder thereon, said shoulder being spaced from one end of said piston, whereby said shoulder compacts said parison between said rib and said piston and surplus plastic is diverted outwardly from said opening.

9. The apparatus according to claim 8 wherein said mold sections include an upstanding ridge around said opening, said ridge being in position to be engaged by said piston shoulder.

References Cited

UNITED STATES PATENTS

| | | |
|---|---|---|
| 3,081,489 | 3/1963 | Jackson. |
| 3,145,243 | 8/1964 | Hagen. |
| 3,363,282 | 1/1968 | Hagen. |

FOREIGN PATENTS

| | | |
|---|---|---|
| 1,033,476 | 6/1966 | Great Britain. |
| 1,172,419 | 2/1957 | France. |

ROBERT F. WHITE, Primary Examiner

R. SHEAR, Assistant Examiner

U.S. Cl. X.R.

264—98